US012694781B2

(12) United States Patent
Gupta et al.

(10) Patent No.: US 12,694,781 B2
(45) Date of Patent: Jul. 28, 2026

(54) CONTROL PANEL FOR FIRE ALARM SYSTEMS AND A METHOD FOR UPDATING THE CONFIGURATION INFORMATION

(71) Applicant: Tyco Fire & Security GmbH, Neuhausen am Rheinfall (CH)

(72) Inventors: Vaibhav Gupta, Bareilly (IN); Sumit Tiwari, Hadapsar (IN); Praveen Deshpande, Atul Nagar (IN); Shishir Tiwari, Dhanori (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 118 days.

(21) Appl. No.: 18/268,119

(22) PCT Filed: Dec. 26, 2021

(86) PCT No.: PCT/IN2021/051206
§ 371 (c)(1),
(2) Date: Jun. 16, 2023

(87) PCT Pub. No.: WO2022/137264
PCT Pub. Date: Jun. 30, 2022

(65) Prior Publication Data

US 2025/0278997 A1 Sep. 4, 2025

(30) Foreign Application Priority Data

Dec. 26, 2020 (IN) ............................ 202011056504

(51) Int. Cl.
*G08B 29/16* (2006.01)
*G08B 25/10* (2006.01)
(Continued)

(52) U.S. Cl.
CPC ............ *G08B 29/16* (2013.01); *G08B 25/10* (2013.01); *G08B 25/14* (2013.01); *G08B 29/22* (2013.01); *G08B 17/00* (2013.01)

(58) Field of Classification Search
CPC ........ G08B 25/14; G08B 29/16; G08B 25/10; G08B 29/22; G08B 17/00
See application file for complete search history.

(56) References Cited

U.S. PATENT DOCUMENTS 8,988,217 B2 * 3/2015 Piccolo, III ............ G08B 25/10 340/506
10,026,303 B1 * 7/2018 Skarda .................. G08B 29/22
(Continued)

FOREIGN PATENT DOCUMENTS

CN 204406597 U 6/2015
EP 2767132 A1 8/2014
EP 3667636 A1 6/2020

OTHER PUBLICATIONS

International Search Report and Written Opinion for International Patent Application No. PCT/IN2021/051206, mailed May 9, 2022 (11 pages).

*Primary Examiner* — John A Tweel, Jr.
(74) *Attorney, Agent, or Firm* — ArentFox Schiff LLP

(57) ABSTRACT

A control panel for a fire alarm system and a method for updating configuration information of a control panel are disclosed. The control panel includes a communication module for short-range communication with a portable electronic device and a processing circuit for updating configuration information using data packets received from the portable electronic device. The processing circuit receives the data packets via short-range communication with the portable electronic device. The control panel comprises a data transfer region, wherein the communication module is configured to establish short-range communica-
(Continued)

tion with the portable electronic device when the portable electronic device is proximal to the data transfer region.

17 Claims, 15 Drawing Sheets

(51) Int. Cl.

| | |
|---|---|
| ***G08B 25/14*** | (2006.01) |
| ***G08B 29/22*** | (2006.01) |
| *G08B 17/00* | (2006.01) |

(56) References Cited

U.S. PATENT DOCUMENTS

| | | | | |
|---|---|---|---|---|
| 10,795,328 | B2 * | 10/2020 | Foisy | H04L 63/0428 |
| 11,954,215 | B1 * | 4/2024 | Lebowitz | G06F 21/6209 |
| 2020/0342745 | A1 | 10/2020 | Oliver et al. | |

* cited by examiner

CONTROL PANEL FOR FIRE ALARM SYSTEMS AND A METHOD FOR UPDATING THE CONFIGURATION INFORMATION

This patent application is a 35 U.S.C. § 371 National Phase of International Patent Application No. PCT/IN2021/051206, entitled "A CONTROL PANEL FOR FIRE ALARM SYSTEMS AND A METHOD FOR UPDATING THE CONFIGURATION INFORMATION," filed on Dec. 26, 2021, which claims priority to Indian Patent Application number 202011056504, entitled "A CONTROL PANEL FOR FIRE ALARM SYSTEMS," filed on Dec. 26, 2020, the disclosures of both of which are incorporated by reference in their entireties.

FIELD

The present disclosure relates to the field of control panels for fire alarm systems.

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Fire alarm systems are often installed within commercial, residential, or governmental buildings. Examples of these buildings include hospitals, warehouses, schools, shopping malls, government buildings, and casinos, to list a few examples. The fire alarm systems typically include control panel(s), initiating device(s), and annunciator(s). Signals from initiating devices are monitored by the control panel, such as a fire alarm control panel ("FACP"). The FACP, upon sensing an alarm condition, sends commands to one or more annunciators to alert occupants in one section of the building, in multiple sections of the building, or in all sections of the building. Annunciators can output a visual notification, an audible notification, or both.

Typically, to read and/or update configuration of the control panel, a technician is required to establish a wired connection between a laptop and the control panel for reading and/or updating configuration. The process additionally requires the technician to access the control panel for establishing the connection. Moreover, the technician is required to carry his/her laptop, cables, and connectors to site. The entire process, therefore, becomes time consuming and tedious which is not desired.

There is, therefore, felt a need to provide a control panel for a fire alarm system that eliminates the requirement of establishing wired connection for communicating with portable electronic devices thereby overcoming the above-mentioned drawbacks.

OBJECTS

Some of the objects of the present disclosure, which at least one embodiment herein satisfies, are as follows:

An object of the present disclosure is to provide a control panel for a fire alarm system.

Another object of the present disclosure is to provide a control panel that eliminates the requirement of establishing wired connection with a portable electronic device.

Still another object of the present disclosure is to provide a control panel that can be wirelessly connected to a portable electronic device.

Yet another object of the present disclosure is to provide a control panel that is provided with Near Field Communication (NFC) capabilities.

Still another object of the present disclosure is to provide a control panel that is cost effective.

Yet another object of the present disclosure is to provide a control panel that can be read and/or updated wirelessly by portable electronic devices.

Other objects and advantages of the present disclosure will be more apparent from the following description, which is not intended to limit the scope of the present disclosure.

SUMMARY

The present disclosure describes a control panel for a fire alarm system. In one aspect of the present disclosure, the control panel comprises a communication module and a data transfer region. The communication module facilitates short-range communication with a portable electronic device. The communication module is configured to establish short-range communication with the portable electronic device when the portable electronic device is proximal to the data transfer region. The communication module includes a near field communication (NFC) unit.

In some embodiments, the data transfer region is an opening provided on a housing of the control panel. In some other embodiments, the data transfer region is defined via markings on a housing of the control panel.

The control panel further comprises a processing circuit configured to store configuration information pertaining to the fire alarm system, to receive one or more data packets from the portable electronic device via short-range wireless communication, and to update at least a part of the configuration information using the one or more data packets.

The processing circuit is configured to authenticate a user of the portable electronic device prior to receiving the one or more data packets. In some embodiments, the processing circuit receives one or more user credentials of the user via a user interface of the control panel for authentication.

The processing circuit is configured to validate the one or more data packets received from the portable electronic device prior to updating the configuration information. The processing circuit falls back to historical configuration information upon detecting failure in updating the configuration information.

In another aspect of the present disclosure, a method is described. The method comprises establishing a short-range wireless communication with a portable electronic device, receiving one or more data packets from the portable electronic device, and updating at least a part of configuration information using the one or more data packets.

The method further comprises a step of authenticating a user of the portable electronic device prior to establishing the short-range wireless communication. A near field communication (NFC) unit is activated upon authenticating a user of the portable electronic device. The short-range wireless communication between the portable electronic device and a communication module is established when the portable electronic device is proximal to a data transfer region of a control panel.

In some embodiments, the method further comprises validating the one or more data packets received from the portable electronic device prior to updating the configuration information.

BRIEF DESCRIPTION OF THE ACCOMPANYING DRAWING

Various objects, aspects, features, and advantages of the disclosure will become more apparent and better understood by referring to the detailed description taken in conjunction with the accompanying drawing, in which like reference characters identify corresponding elements throughout. In the drawings, like reference numbers generally indicate identical, functionally similar, and/or structurally similar elements.

A control panel for a fire alarm system, of the present disclosure, will now be described with the help of the accompanying drawing, in which.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

Before turning to the Figures, it should be understood that the disclosure is not limited to the details or methodology set forth in the description or illustrated in the figures. It should also be understood that the terminology is for the purpose of description only and should not be regarded as limiting.

Building and Building Management System

Figure 1:
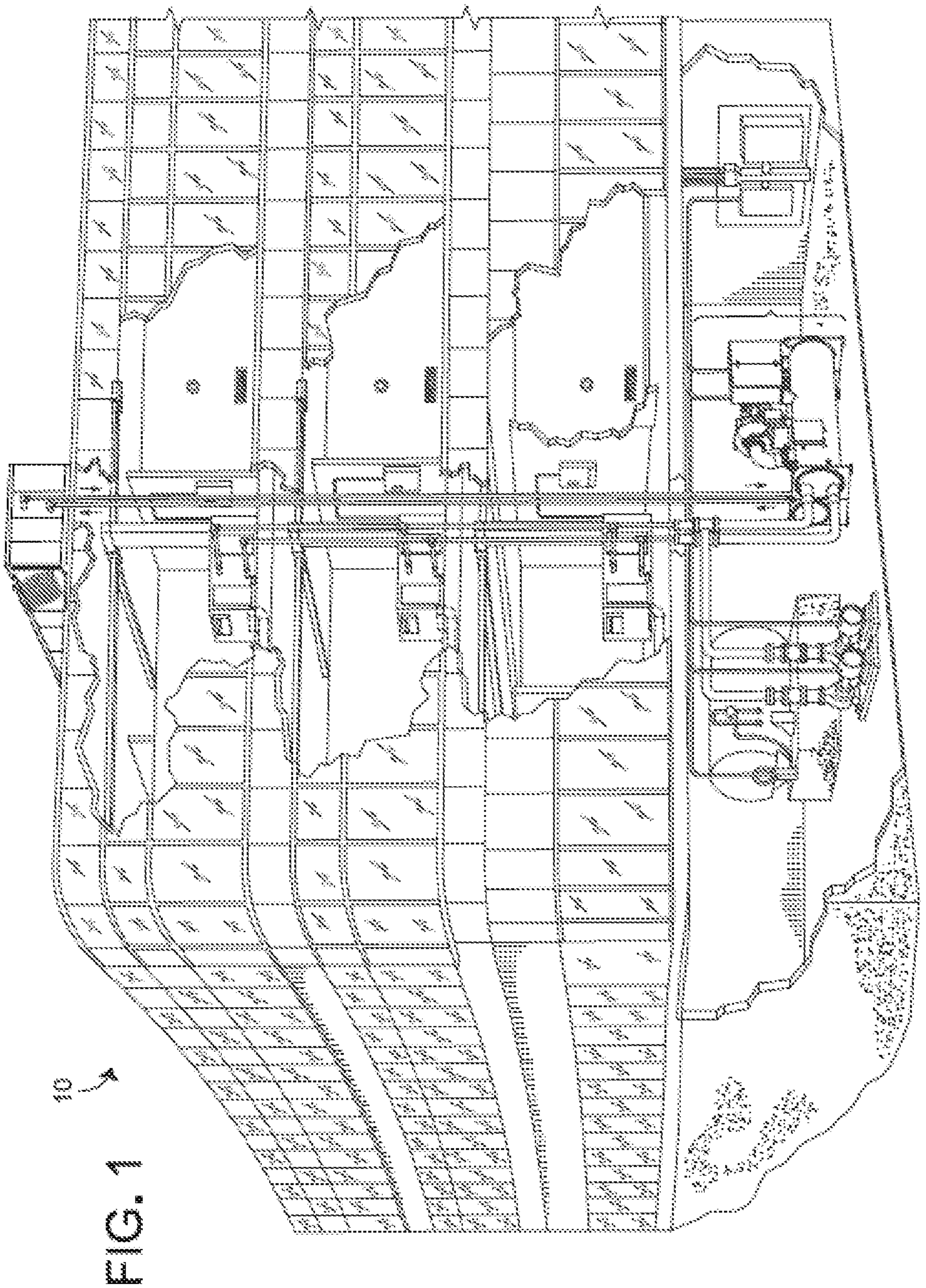
FIG. 1 is a drawing of a building equipped with a building management system (BMS), according to some embodiments.

Referring now to FIG. 1, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
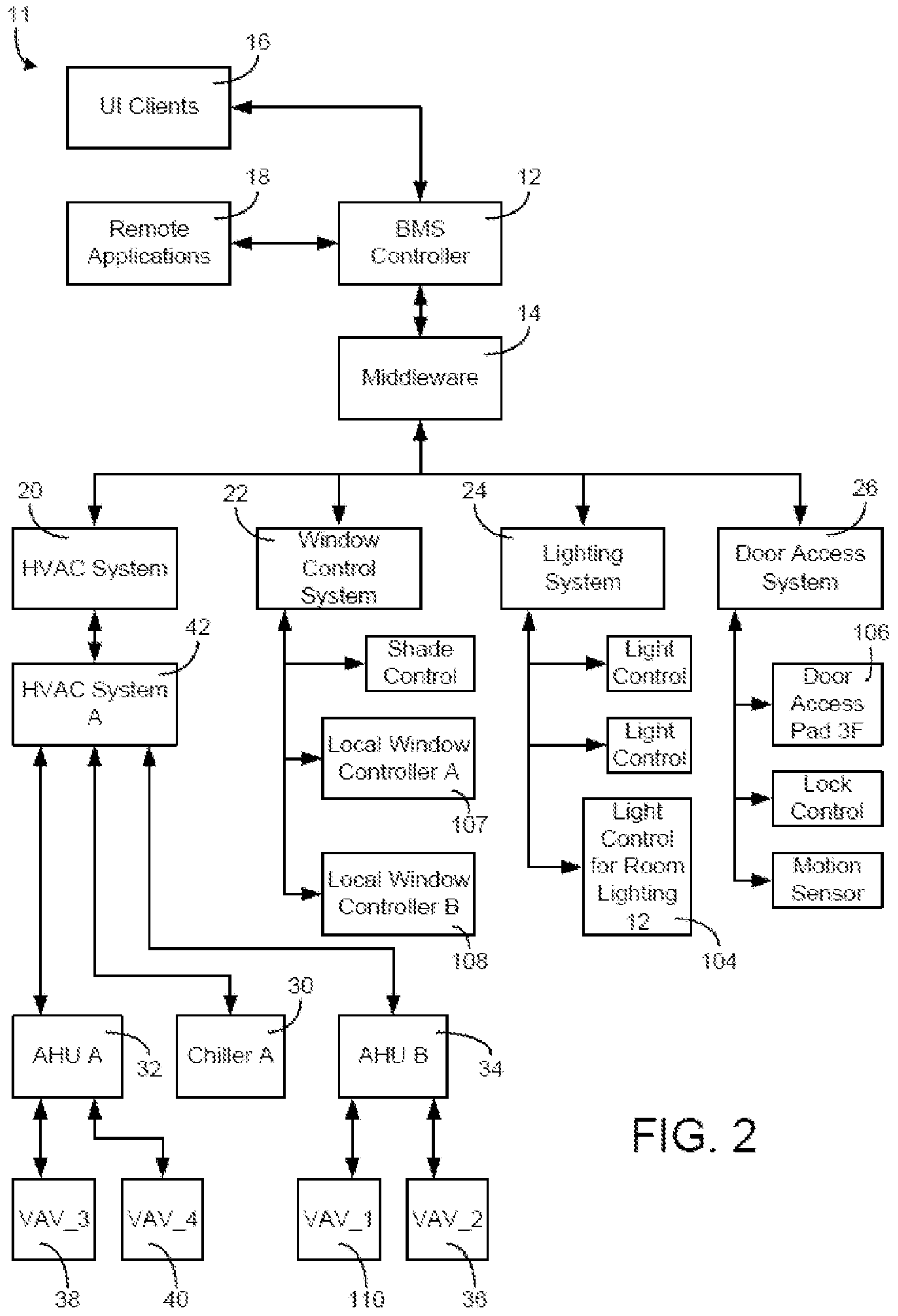
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may be integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
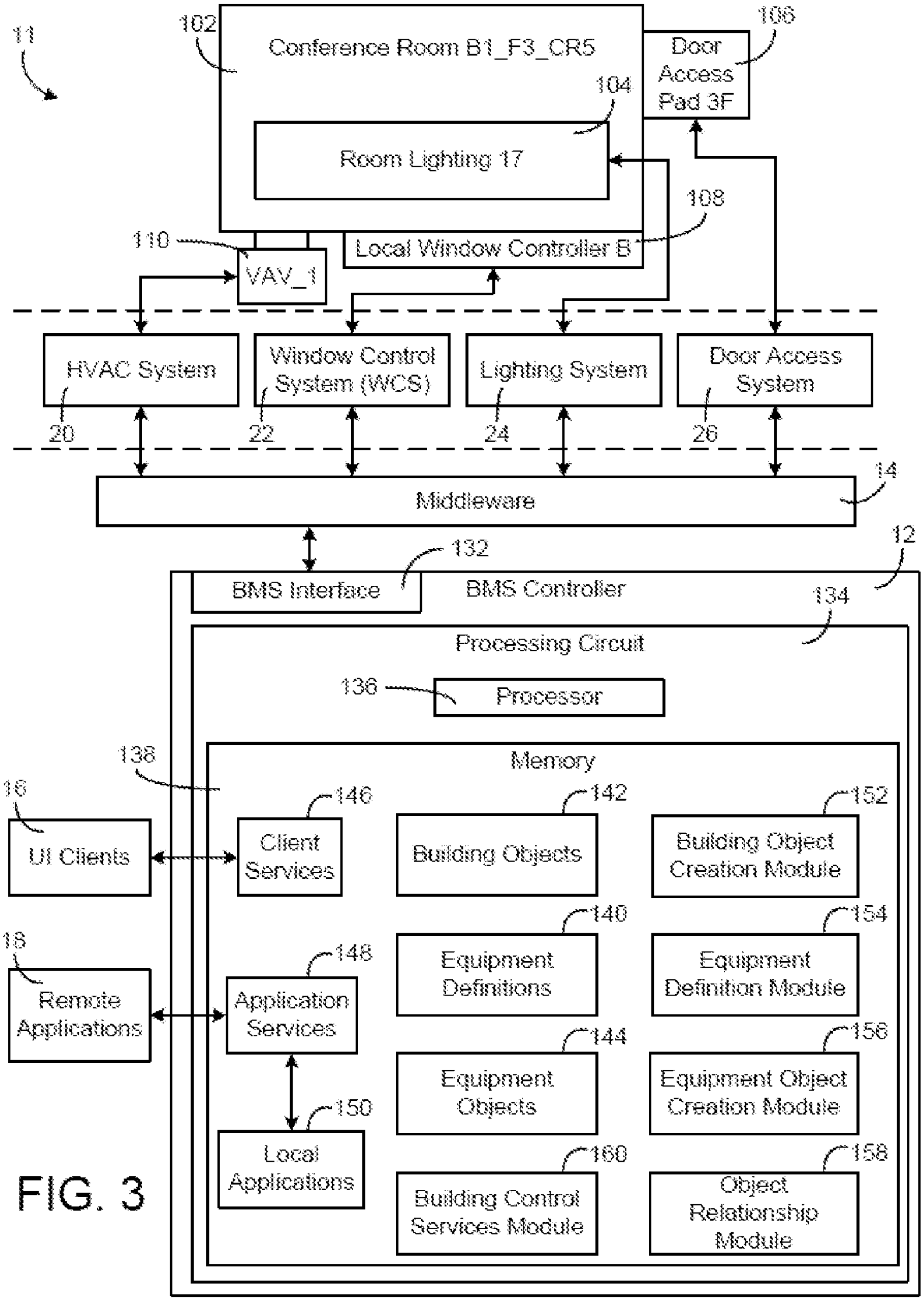
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, an NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20. DPR-POS" (i.e., the damper position of VMA-20) and/or "VMA-20. SUP-FLOW" (i.e., the supply air flow rate through VMA-20).

Equipment definition module 154 abstract the equipment-specific data points to generate abstracted data point types that are generally applicable to other equipment of the same type. For example, equipment definition module 154 may abstract the equipment-specific data point "VMA-20. DPR-POS" to generate the abstracted data point type "DPR-POS" and may abstract the equipment-specific data point "VMA-20. SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20. SUP-FLOW." Advantageously, the abstracted text string matches other equipment-specific data points corresponding to the supply air flow rates of other BMS devices (e.g., "VMA-18. SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18. SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, wireless sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
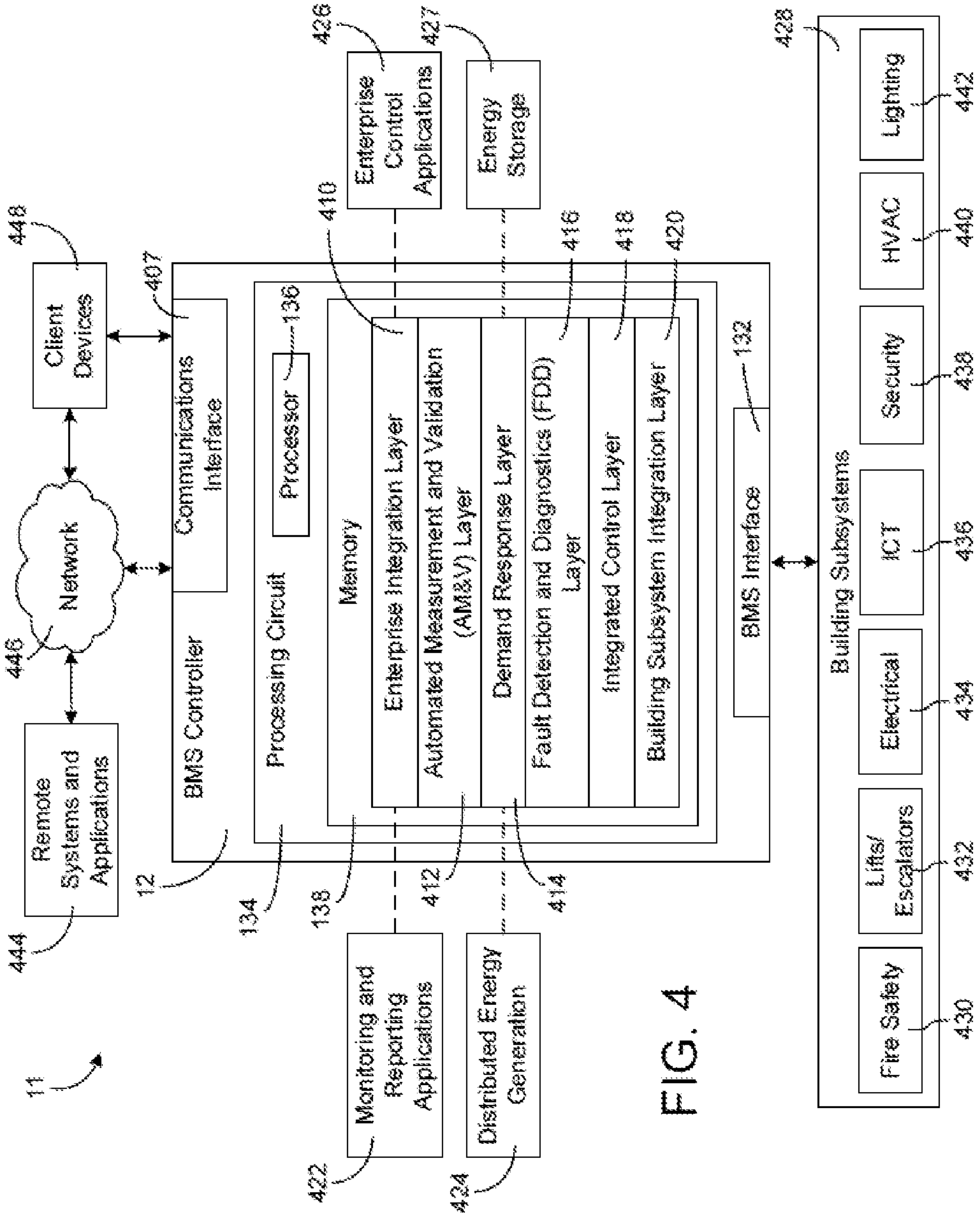
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general-purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a user interface such as a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

A Control Panel for a Fire Alarm System

A control panel for a fire alarm system of the present disclosure is now described with reference to accompanying figures. The control panel is configured to control operation of the fire alarm system. In some embodiments, the control panel receives input signals from one or more input devices of the fire alarm system. The input devices are configured to sense various fire related parameters, such as, but not limited to, smoke, rise in temperature etc. The input devices sense the fire related parameters and transmit the input signals corresponding to the sensed fire related parameters to the control panel. The control panel processes the input signals to determine occurrence of fire event. If the fire event is detected, the control panel generates output signals and transmit to output devices of the fire alarm system. The control panel typically generates audio alarms. In some embodiments, the control panel is configured to actuate the fire suppression devices of the fire alarm system such as sprinklers.

Figure 5:
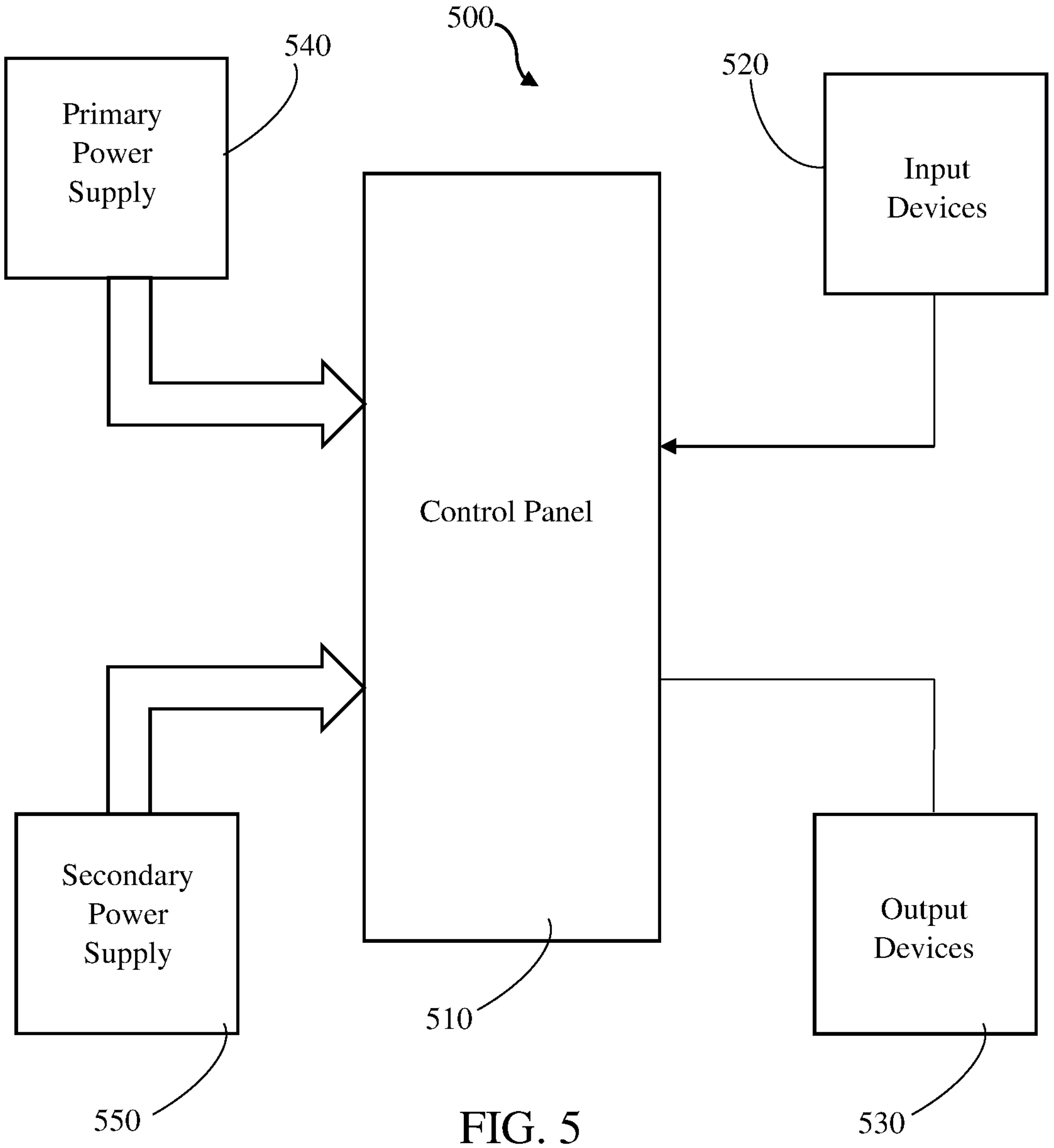
FIG. 5 is a block diagram of a fire alarm system, according to some embodiments of the present disclosure.

Referring now to FIG. 5, a block diagram of a fire alarm system 500 is depicted. The fire alarm system 500 includes a plurality of fire alarm devices and a control panel 510. The control panel 510 is enabled to control operation of the plurality of fire alarm devices of the fire alarm system. The fire alarm devices include one or more input devices 520 and one or more output devices 530. Typically, the input devices 520 and/or output devices 530 are positioned throughout building 10 of FIG. 1. The input devices 520 can be any device that causes an environmental event signal to be sent to control panel 510. More specifically, the input devices 520 are configured to sense various parameters such as temperature, pressure, presence of certain gases, smoke that can be used to detect an event of fire. For example, the input device 520 can be a smoke detector that detects smoke which is an indication of occurrence of fire nearby the smoke detector. In another example, the input device 520 can be a temperature sensor that detects temperature of surroundings. The temperature values sensed by the temperature sensor can be used to detect an occurrence of fire if rise in temperature beyond a certain limit is observed in sensed temperature values.

In an embodiment, input devices 520 are initiating devices that can include, but not limited to, smoke detectors, heat detectors, flame detectors, pull stations, gas detectors such as carbon monoxide detectors, natural gas detectors, and the like.

In some embodiments, output devices 530 are notification appliances that can be selected from, but not limited to, strobes, speakers, buzzers, visual indicators, displays or any combination thereof. The notification appliances, i.e., the output devices 530 can be enabled to broadcast live or pre-recorded voice and/or video messages. In one embodiment, either or both input devices 520 and output devices 530 are IoT enabled devices. In some embodiments, the output devices 530 can include fire suppression devices such as sprinklers.

In an embodiment, the signals from input devices 520 are received and monitored by the control panel 510. Specifically, the control panel 510 is a system controller or a fire alarm control panel, i.e., FACP. The control panel 510 upon sensing an alarm condition sends commands to one or more output devices 530 to alert occupants of the building 10. In an exemplary embodiment, the control panel 510 may only activate output devices associated with one or more zones of the building 10.

The control panel 510 is provided with a power supply. As shown in FIG. 5, the control panel 510 is connected to a primary power supply 540 and a secondary power supply 550. The primary power supply 540 can be mains supply and the secondary power supply 550 can be an auxiliary power supply utilized for powering control panel 510 in absence or interruption of primary power supply 540.

Figure 6:
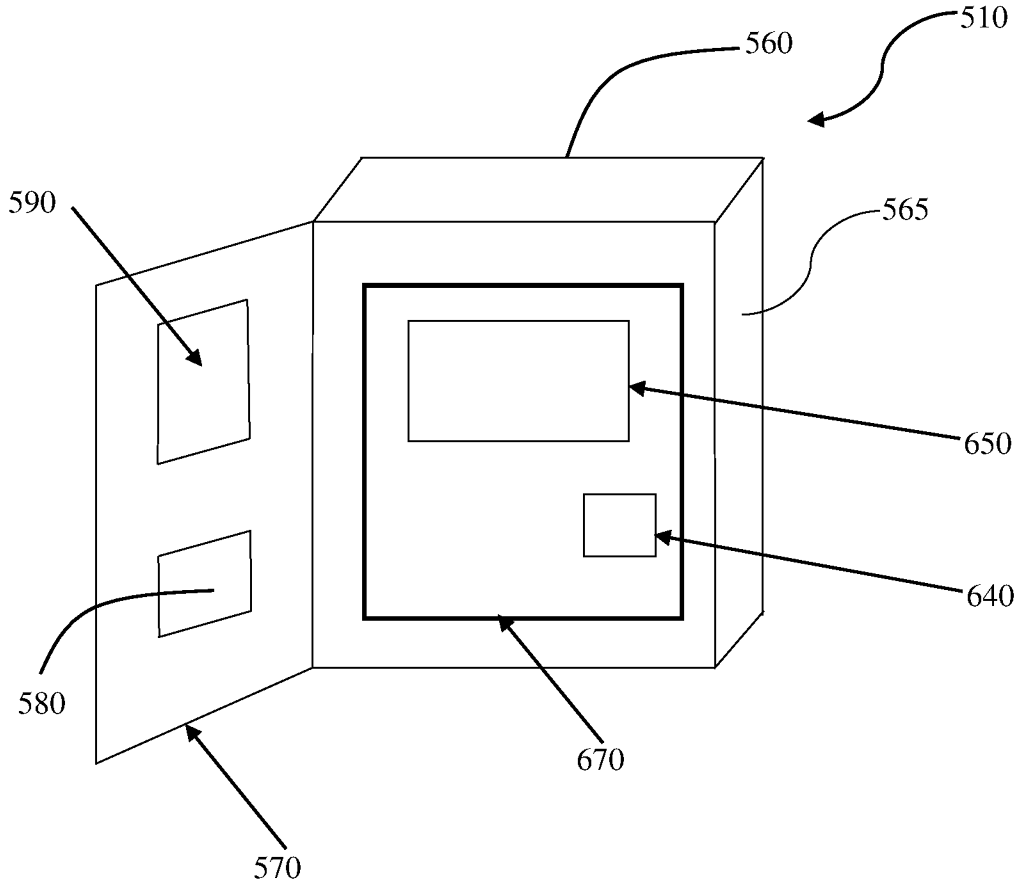
FIG. 6 is a schematic view of a housing of a control panel, according to some embodiments.

Referring to FIG. 6, a schematic view of the control panel 510 is shown. The control panel 510 comprises a housing 560 for accommodating various components of the control panel. The housing 560 can have any suitable shape. As shown in FIG. 6, the housing 560 is box shaped. In some embodiments, the housing 560 comprises a housing body 565 having a space for housing components and a door 570 attached to the housing body 565. The door 570 can be provided with a safety lock which can be unlocked by an authorized person. The lock can be a mechanical lock or a digital lock requiring authentication from a user for opening the door 570. The authentication can be performed using passwords and/or biometric authentication. In the biometric authentication, a user is required to verify his one or more biometric details in order to open the door 570 to gain access to interior of the housing 560. In some embodiments, the door 570 can be hinged to the housing body 565. In some other embodiments, the door 570 can be temporarily detached from the housing body 565 and can be reattached to the housing body 565.

The housing 560 can be made of any suitable material. In some embodiments, the housing 560 is made of metallic material. In some other embodiments, the housing 560 is made of plastic or any other non-metallic material. In some other embodiments, the housing body 565 and the door 570 can be made of different materials. For example, the housing body 565 can be made of metallic material, whereas the door 570 can be made of non-metallic material or vice-versa. The housing 560 is provided with apertures or slots to provide a passage to electrical wires connected between components within the housing 560 and devices of the fire alarm system 500 outside the housing 560. The apertures or slots are provided with proper insulation to prevent ingress of dust and moisture in the housing.

The control panel 510 has a data transfer region 580. When a portable electronic device is placed proximal to or in physical contact with the data transfer region 580, data can be transferred between the portable electronic device and the control panel 510 via short-range wireless communication. Preferably, the data transfer region 580 is provided on a portion of the housing 560 which facilitates radio frequency data transfer therethrough without data losses. For example, the data transfer region 580 is provided on non-metallic portion of the housing 560.

In some embodiments, the data transfer region 580 is provided on the door 570. In some embodiments, the data transfer region 580 is provided on sides of the housing body 565. The data transfer region 580 is clearly defined for quick identification. The data transfer region 580 can be in various forms. In some embodiments, as shown in FIG. 6, the data transfer region 580 is in form of an opening provided on the door 570 of the housing 560. The opening can be provided with a transparent glazing to enable a user to view components within the housing 560 without opening the door 570. Typically, the opening is provided when the door 570 is of metallic material. However, the opening can be provided even when the door 570 is made of non-metallic material. In some other embodiments, the door 570 can be of metallic material provided with the data transfer region 580 made of non-metallic material.

Figure 7:
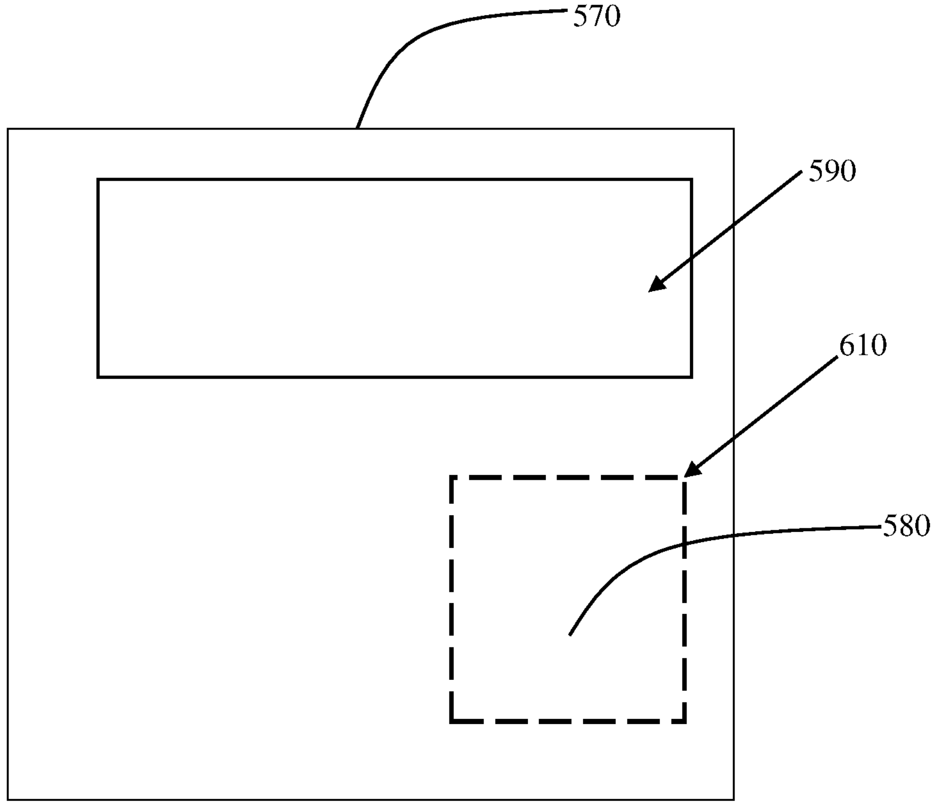
FIG. 7 is a schematic view of a door of the housing of FIG. 6, according to some embodiments.

In some embodiments, as shown in FIG. 7, the data transfer region 580 is defined on the door 570 of the housing 560 using markings 610. Preferably, the door 570 is made of non-metallic material. In some other embodiments, the data transfer region 580 can be provided at other locations, such as housing body 565. The markings 610 can be in the form of dashed or continuous lines, patterns, labels, color codes etc. In some embodiments, the data transfer region 580 is suitably labeled using alphabets and/or symbols.

Figure 8:
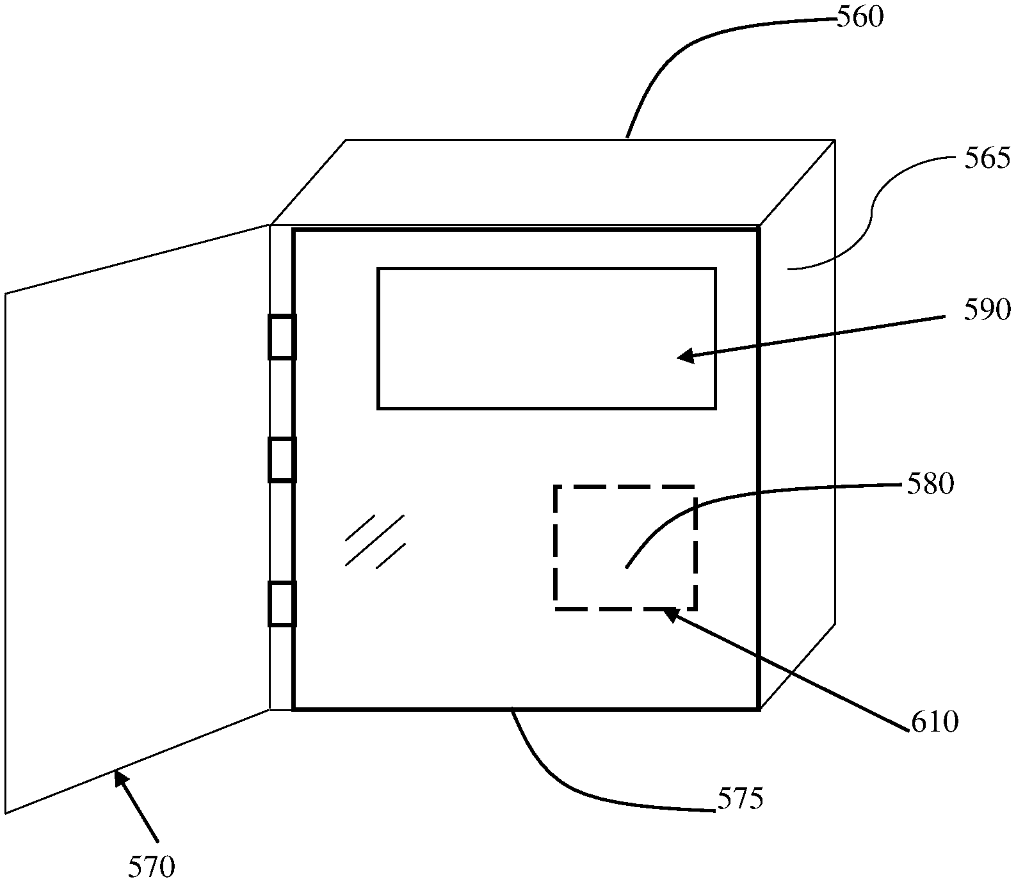
FIG. 8 is another schematic view of the housing, according to some embodiments.

In some other embodiments, as shown in FIG. 8, the housing 560 includes a cover 575 provided between the door 570 and the housing body 565. The data transfer region 580 is provided on the cover 575. Preferably, the cover 575 is made of a non-metallic material to facilitate radio frequency data transfer therethrough. In some embodiments, the cover 575 is made of transparent material. In some embodiments, the cover 575 is provided when the door 570 is made of metallic material. The data transfer region 580 is defined on the cover 575 using markings 610. The cover 575 can have length and height same as that of the door 570. In other embodiments, the cover 575 can have smaller dimensions than the door 570.

Figure 9:
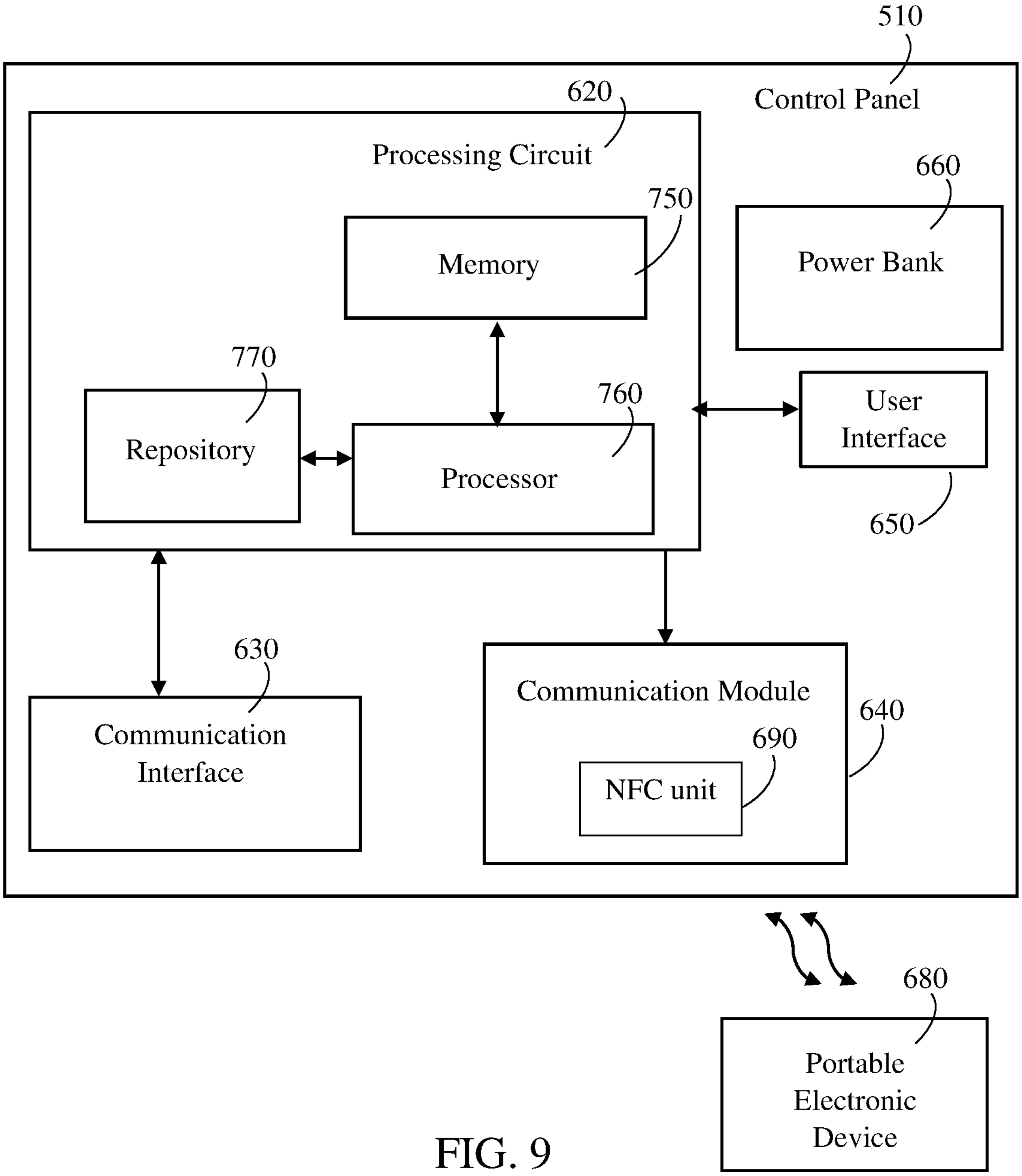
FIG. 9 is block diagram of the control panel of the fire alarm system of FIG. 5 in communication with portable electronic device(s), according to some embodiments.

Referring to FIG. 9, a block diagram of the control panel 510 is shown in accordance with some embodiments of the present disclosure. The control panel 510 includes a processing circuit 620, a communication interface 630, a communication module 640, a user interface 650 and the power bank 660. In some embodiments, the processing circuit 620, the communication interface 630, the communication module 640, and the user interface 650 are housed within the housing 560. In some other embodiments, the communication interface 630, the communication module 640, and/or the user interface 650 can be mounted on outer surfaces of the housing 560. For example, the communication module 640 can be mounted on an outer surface of one of the sides or the door 570 of the housing 560 for facilitating easy access to the communication module 640.

Although FIG. 9 depicts power bank 660 as part of the control panel 510, it is understood that the power bank 660 can reside within the housing 560 (shown in FIG. 6) of the control panel 510 or can be remotely placed within the premises of building 10.

In some embodiments, the control panel 510 includes a printed circuit board (PCB) 670 (shown in FIG. 6) for mounting the processing circuit 620, the communication interface 630, the communication module 640, and the user interface 650. The PCB 670 facilitates mounting of aforementioned components of the control panel 510 as well as provides reliable electrical connections between aforementioned components in a controlled manner.

The communication interface 630 enables connection of the control panel 510 with the devices such as the input devices 520 and the output devices 530 of the fire alarm system 500. The communication interface 630 can be or include wired or wireless communications interfaces (e.g., jacks, antennas, transmitters, receivers, transceivers, wire terminals, etc.) for establishing data communications with input devices 520, output devices 530, or other external systems or devices. In various embodiments, communications via communication interface 630 can be direct (e.g., local wired or wireless communications) or via a communications network (e.g., a WAN, the Internet, a cellular network, etc.). For example, the communication interface 630 can include an Ethernet card and port for sending and receiving data via an Ethernet-based communications link or network. In another example, communication interface 630 can include a Wi-Fi transceiver for communicating via a wireless communications network. In another example, the communication interface 630 can include cellular or mobile phone communications transceivers.

The communication module 640 is configured to establish a wireless connection with a portable electronic device 680. Preferably, the communication module 640 is enabled to facilitate short-range wireless communication with the portable electronic device 680. In an embodiment, the portable electronic device 680 can be selected from the group consisting of, but is not limited to, a smartphone, a tablet, a mobile phone, a personal digital assistant (PDA), a mobile computing device, a personal information manager (PIM) with a wireless interface, an ultra-mobile PC, a tablet computer (such as an iPad®), or the like. The smartphone is a mobile phone that provides more advanced computing ability and connectivity than a contemporary basic feature phone. The smartphone includes the functionality of a handheld computer integrated within a mobile telephone. Specifically, the portable electronic device 680 can be any electronic device with communication and processing capabilities.

The communication module 640 is provided with Near Field Communication (NFC) unit 690. In some embodiments, the communication module 640 can be provided with both NFC unit and radio frequency identification (RFID) communication unit. The control panel 510 can selectively and/or simultaneously utilize NFC unit 690 and RFID. In some other embodiments, the communication module 640 can include a Bluetooth unit, an infrared communication unit or any other suitable short-range wireless communication unit in addition to the NFC unit 690.

In one implementation of the present disclosure, the NFC unit 690 employs a transceiver integrated circuit that is an integrated analog front end and data-framing device for a 13.56-MHz RFID/Near Field Communication system.

In some embodiments, the communication module 640 is arranged such that it is proximal to the data transfer region 580. In some embodiments, the communication module 640 is placed behind the data transfer region 580 with respect to a user. More specifically, the data transfer region 580 overlaps the communication module 640. In some embodiments, the cover 575 is provided on the communication module 640, wherein the data transfer region 580 is defined on the cover 575. In some other embodiments, the data transfer region is defined on the communication module 640 itself. The communication module 640 is configured to establish short-range communication with the portable electronic device 680 when the portable electronic device 680 is proximal to the data transfer region 580. In some embodiments, the portable electronic device 680 is placed in physical contact with the data transfer region 580 to enable short-range wireless communication between the communication module 640 and the portable electronic device 680.

The power bank 660 can be electrically coupled to the secondary power supply 550 for supplying power. In one embodiment, the power bank 660 may include one or more batteries. In one other embodiment, the power bank 660 may also be provided with one or more supercapacitors. In still another embodiment, the power bank 660 may comprise both the one or more supercapacitors and the one or more batteries.

Referring to FIG. 11-14, the user interface 650 of the control panel 510 is shown. The user interface 650 is provided to receive user inputs and to display data related to the control panel 510. The user input pertains to one or more of operating commands, selection of one or more operating modes, user credentials, and the like. In some embodiments, the user interface 650 is provided in the housing 560, wherein access means are provided on the housing 560 to access the user interface 650. In some embodiments, the access means can be an opening 590 or any other suitable means. The user interface 650 can be accessed by opening the door 570 or through the opening 590. The user interface 650 comprises a display 700, user input means 710, and indicators 720. The user input means 710 are provided to receive inputs from a user. In some embodiments, the user input means 710 can be an alphanumeric keypad. In some embodiments, the display 700 is a touchscreen display which can show data as well as receive inputs from the user. In some other embodiments, the display 700 can be one of, but not limited to, a Liquid Crystal Display (LCD), a seven-segment display, a backlit LCD display, and a Light Emitting Diode (LED) display. The indicators 720 are provided to indicate occurrences of various events related to the fire alarm system 500. For an example, the indicators 720 can indicate occurrence of fire, supply status of power supply, establishment of short-range wireless communication between the portable electronic device 680 and the control panel, or data transfer between the portable electronic device 680 and the control panel etc. The indicators 720 can be provided with labels 730 and an indication lamp 740. The indication lamp 740 can be turned ON to indicate occurrence of an event. The details of that event can be provided on the label 730. The processing circuit 620 is provided to store configuration information pertaining to the fire alarm system 500, to receive one or more data packets from the portable electronic device 680 via short-range wireless communication, and to update at least a part of the configuration information using the one or more data packets.

In some embodiments, the user interface 650 is configured to display data related to capabilities of the control panel 510. For example, the user interface 650 can display options related to functionalities of the control panel 510 such as universal serial bus (USB), system default, device aping, near field communication (NFC) etc. The user interface 650 is configured to display progress of operations carried out by the control panel 510. For example, the user interface 650 can display progress of ongoing NFC transfer. Further, the user interface 650 is configured to display various process related data such as failure in operating certain features of the control panel 510 or failure in establishing NFC communication, interruption in NFC communication, and the like.

Referring to FIG. 9-14, the control panel 510 is described in detail. The processing circuit 620 of the control panel 510 is configured to store configuration information pertaining to the fire alarm system 500. In an embodiment, the configuration information is related to at least one of input devices, output devices, and the control panel. Typically, the configuration information is data related to identification, operation, and control of the devices and/or the control panel 510 of the fire alarm system 500 such as, but not limited to, name, type, location, operating conditions, labels, zones, operating parameters etc. of the devices and/or the control panel 510.

The configuration information can be initially loaded in the processing circuit 620 while the control panel 510 is being commissioned. However, during operating life of the fire alarm system, the configuration information needs to be updated based on customization, modifications, or enhancements being made to the fire alarm system 500. In some embodiments, the enhancements can be due to addition of one of more input devices or output devices. In some other embodiments, the modification can be due to replacement of one or more previously deployed input device or output device.

Figure 10:
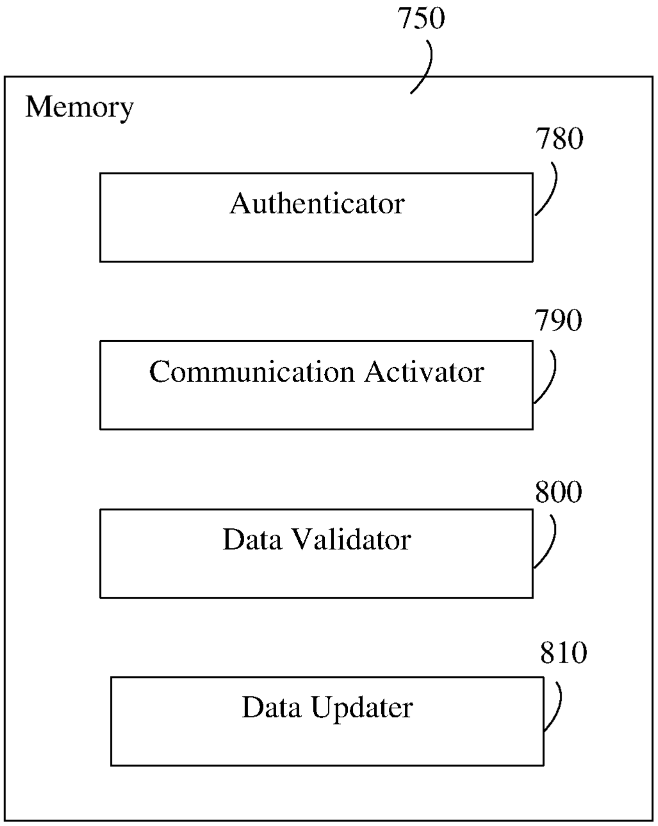
FIG. 10 is a block diagram of a memory of a processing circuit of the control panel shown in FIG. 9.

Referring to FIGS. 9-10, the processing circuit 620 is configured to communicate with the portable electronic device 680 using short-range wireless communication technique, such as NFC, to receive and/or transmit one or more data packets. In an embodiment, the data packets being received from the portable electronic device 680 can pertain to data patch essential for updating at least a portion of the configuration information. In one embodiment, the data packets being transmitted from the control panel 510 to the portable electronic device 680 may pertain to current software version, current configuration information, or system logs, alert logs, etc. related to the control panel 510 or other devices of the fire alarm system 500.

Still referring to FIGS. 9 and 10, the processing circuit 620 includes a memory 750, a processor 760, and a repository 770. The processing circuit 620 is communicatively coupled with the communication interface 630 and the communication module 640 such that the processing circuit 620 and various components thereof can send and receive data and/or signals. Processor 760 can be implemented as a general-purpose processor, an application specific integrated circuit (ASIC), one or more field programmable gate arrays (FPGAs), a group of processing components, or other suitable electronic processing components.

Memory 750 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 750 can be or include volatile memory or non-volatile memory. Memory 750 can include database components, object code components, script components, or any other type of information structure for supporting the various activities and information structures described in the present application. According to some embodiments, memory 750 is communicably connected to processor 760 via processing circuit 620 and includes computer code for executing (e.g., by processing circuit 620 and/or processor 760) one or more processes described herein.

Referring to FIG. 9, the repository 770 is communicatively connected to the processor 760. The repository 770 can include one or more devices (e.g., ROM, Flash memory, hard disk storage, etc.) configured for storing historical data associated with one or more input devices 520, configuration information pertaining to the fire alarm system 500 including its devices and control panel 510, status reports of one or more input devices 520 and/or output devices 530, access history, and historical data pertaining to generation of alert signals by one or more input devices 520, among others. In an embodiment, the repository 770 can be or include non-volatile memory and/or volatile memory. Repository 770 can include database components, object code components, script components, or any other type of information structure for supporting the various activities and information structures described in the present application. Although, the repository 770 is shown as part of the processing circuit 620 it is to be understood that the repository 770 can be a separate unit. In an embodiment, the repository 770 can correspond to a remote data storage or remote database.

The configuration information stored in the repository 770 includes information related to device details and their operations. For example, the configuration information can include, name, type, location, operating conditions, labels, zones, operating parameters, operating codes, firmware etc. of the devices and/or the control panel 510 of the fire alarm system 500. However, the term 'configuration information' used in the present disclosure is not limited to aforementioned attributes and can include any type of data related to identification, operation, and control of the devices and/or the control panel 510 of the fire alarm system 500. The configuration information is required to be updated when a new device is to be incorporated in the fire alarm system 500 or attributes or data related to existing device of the fire alarm system 500 are to be altered. In such cases, a part of the configuration information related to new or existing device is updated.

To update at least a part of the configuration information, the processing circuit 620 establishes short-range wireless communication with the portable electronic device 680 via the communication module 640. The portable electronic device 680 transmits one or more data packets having updated configuration information or one or more data patches. The processing circuit 620 receives the one or more data packets and updates at least a part of the prestored configuration information using received data packets from the portable electronic device 680. In some embodiments, the processing circuit 620 updates configuration information using one or more data packets. In some other embodiments, the processing circuit 620 replaces the existing configuration information with latest configuration information received via one or more data packets. In some embodiments, the processing circuit 620 modifies only a part of configuration information using the received one or more data packets.

Referring to FIGS. 10, the memory 750 is shown to include an authenticator 780 that is configured to authenticate a user of the portable electronic device 680. In some embodiments, the authenticator 780 may prompt the user to provide user credentials in form of user input via the user interface 650 of the control panel 510 prior to accessing one or more functionalities of the control panel 510. In some other embodiments, the authenticator 780 may prompt the user to provide user credentials via the user interface 650 prior establishing short-range wireless communication between the control panel 510 and the portable electronic device 680. The user credentials can include, but not limited to, passwords, biometric details, pattern, etc. The authenticator 780 is configured to validate the user credentials with prestored user credentials. The authenticator 780 generates an authentication signal indicating successful authentication, i.e., when received credentials are in confirmation with the prestored user credentials. Subsequently, the user is allowed to access to one or more functionalities of the control panel 510. In an alternative event, the authenticator 780 is configured to generate a flag signal when validation of user credential is unsuccessful. The processing circuit 620 denies access to the user and displays an error message on the user interface 650. Additionally, the processing circuit

620 may generate notification via one or more indicators 720 provided on the user interface 650 regarding successful authentication or failed authentication.

The memory 750 further includes a communication activator 790 provided to activate the communication module 640. The communication activator 790 activates the communication module 640 based on successful authentication, on receiving command from the user for activating the communication module 640 via the user interface 650, or both. In some embodiments, the communication activator 790 is in communication with the authenticator 780 and activates the communication module 640 upon receiving the authentication signal generated by the authenticator 780. In case the communication activator 790 receives the flag signal from the authenticator 780 which signifies that the authentication was failed, the communication activator 790 denies activation of the communication module 640 and can prompt a message about the same on the user interface 650.

In some embodiments, wherein the authenticator 780 authenticates the user prior to accessing one or more functionalities of the control panel 510, the communication activator 790 is configured to activate communication module 640 upon receiving a command from the user for initiating communication module 640 via the user interface 650. In this case, the communication activator 790 may not require the authentication signal as the user cannot access the control panel 510 for providing the command for initiating communication module 640 without successful authentication. In some embodiments, the processing circuit 620 may prompt a user to authenticate prior to selecting the command for initiating communication module 640 or after selecting the command for initiating communication module 640.

In some embodiments, the communication activator 790 activates the communication module 640 for a predetermined time period until the portable electronic device 680 is connected/paired to the communication module 640 via short-range wireless communication. The predetermined time period can be stored in the repository 770. To establish the communication, the portable electronic device 680 needs to have an active short-range communication facility and should be in proximity with the communication module 640, more specifically with the data transfer region 580. Once the portable electronic device 680 is in communication with the communication module 640 via short-range communication, data packets are transferred between the portable electronic device 680 and the control panel 510. The data packets can be transmitted in batches or all at once as per user preference.

In case any device (for example, the portable electronic device 680) is not connected or not in communication with the communication module 640 for the predetermined time period, the communication activator 790 deactivates the communication module 640. The communication activator 790 can include a timer or a counter to determine time elapsed post activation of the communication module 640.

Figure 13:
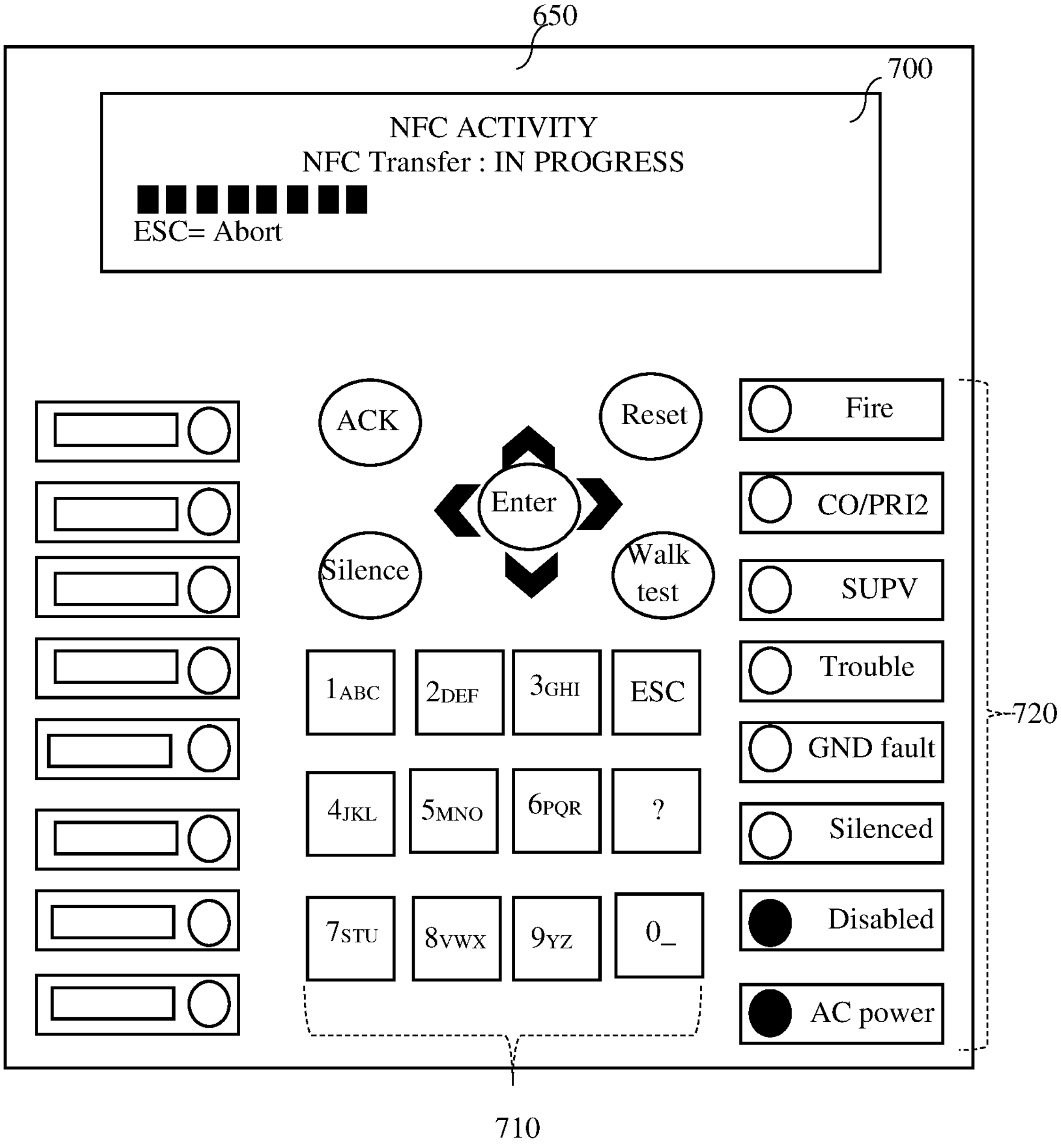

In some embodiments, the communication activator 790 is configured to display status of data transfer on the user interface 650. For example, the communication activator 790 can display a message 'NFC Transfer: IN PROGRESS' (as shown in FIG. 13) and showing progress of data transfer in filled blocks on the user interface 650.

Still further, the memory 750 is shown to include a data validator 800 that is configured to receive data packets from the portable electronic device 680 through the communication module 640. The data validator 800 is responsible for validating the one or more data packets received from the portable electronic device 680 prior to utilizing the data packets to update the configuration information. The data validator 800 validates the data packets based on predetermined rules or test logic. In one example, the data validator 800 may include a debugger that scans the data packets to one or more errors in the received data packets. In one other example, the data validator 800 can check if the received data packets are related to the fire alarm system 500 or whether the received data packets are corrupted, tampered, partially received, etc. Once the data packets are validated, the data validator 800 tags those data packets as valid and additionally generates a data validation signal. If the data validator 800 determines that one or more data packets of the received data packets are invalid, the data validator 800 may tag such data packets as invalid and may additionally generate a data invalid signal. In some embodiments, the data validator 800 can generate data validation or data invalidation signals corresponding to each of the received data packets separately. In some embodiments, the data validator 800 stores received data packets with timestamp in the repository 770.

Still referring to FIG. 10, the memory 750 is shown to include a data updater 810. The data updater 810 is configured to cooperate with the data validator 800 to receive validation and/or invalidation signals. The data updater 810 is configured to update at least a part of the configuration information based on tagging provided by the data validator 800. That is, the data updater 810 updates the configuration data utilizing only those data packet(s) that are tagged as valid and further configured to discard the data packet(s) that are tagged as invalid. In some embodiments, the data updater 810 may check for tagging of the data packets subsequent to reception of the validation signal and/or invalid signal. That is, in case the validation signals are generated for particular data packets, the data updater 810 updates the configuration information using only those data packets for which validation signals are provided by the data validator 800. In some embodiments, updating the configuration information includes, but not limited to, updating full or partial panel configuration, upgrading panel firmware etc.

In some embodiments, the data updater 810 is configured to reboot the control panel 510 to update the configuration information. Once the updating of configuration information is completed, the data updater 810 is configured to display a message (for example, 'updating task complete') indicating completion of the configuration information updating on the user interface 650. The data updater 810 is further configured to detect errors or failure while updating the configuration information. The data updater 810 is configured to display a message (for example, 'error in updating') on the user interface 650 indicating failure or errors in updating configuration information. The data updater 810 is configured to fall back or roll back to historical configuration information upon detecting failure in updating the configuration information. In an embodiment, the historical configuration information relates to a last known configuration information that was being utilized by the control panel 510 prior updating. The historical configuration information is stored in the repository 770.

In some embodiments, the processing circuit 620 is configured to provide indications based on signals generated by other components of the processing unit 620. In some embodiments, the processing circuit 620 provides the indicators 720 on the user interface 650. For example, the processing circuit 620 can provide visual indication by turning ON an indication lamp 740 when data packets are being transferred between the portable electronic device 680 and the control panel 510. In some embodiments, the processing circuit 620 can generate audio alarms corresponding to the indications.

Figure 11:
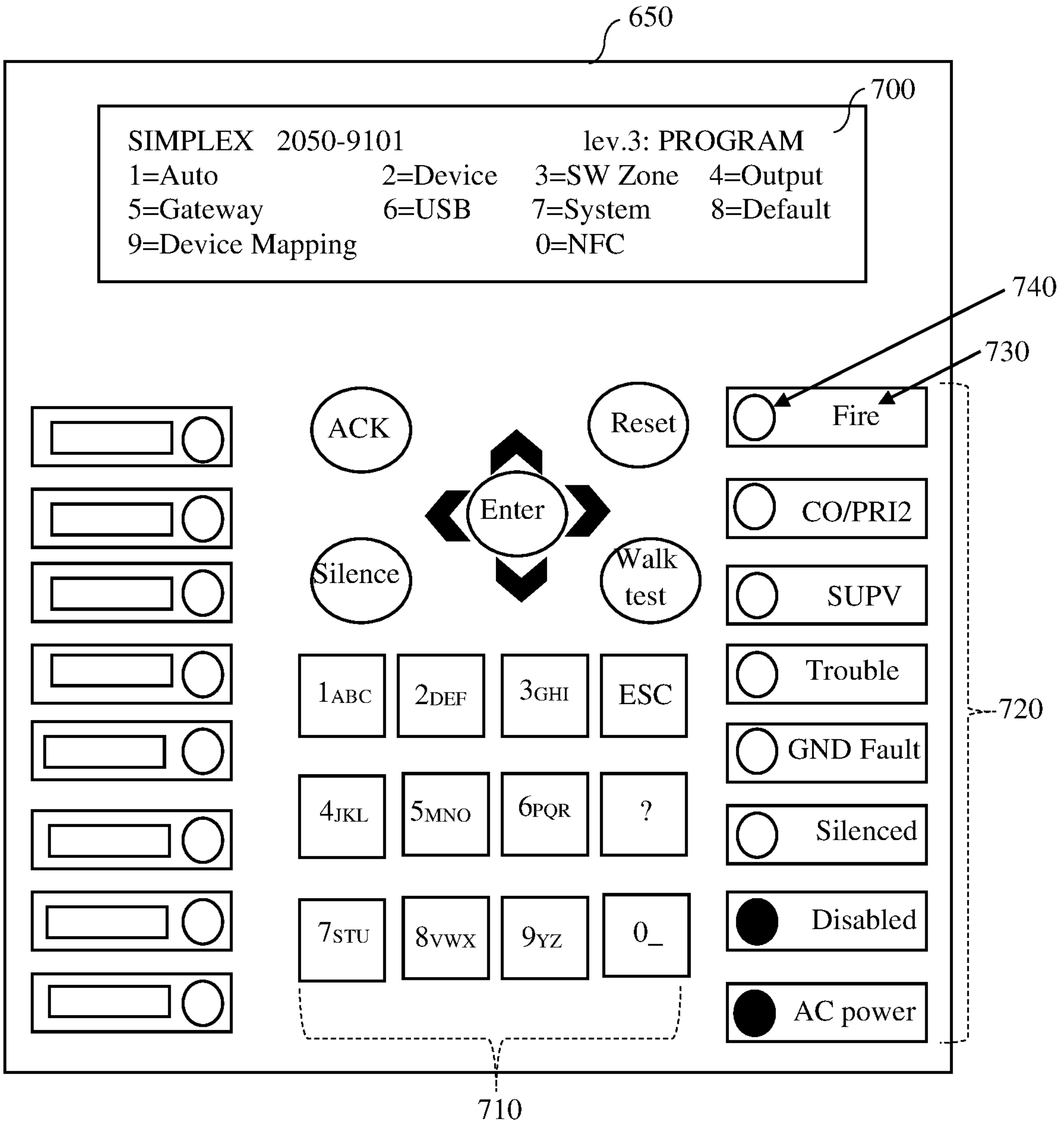
FIGS. 11-14 are schematic views of a user interface of the control panel of FIG. 9.
Figure 12:
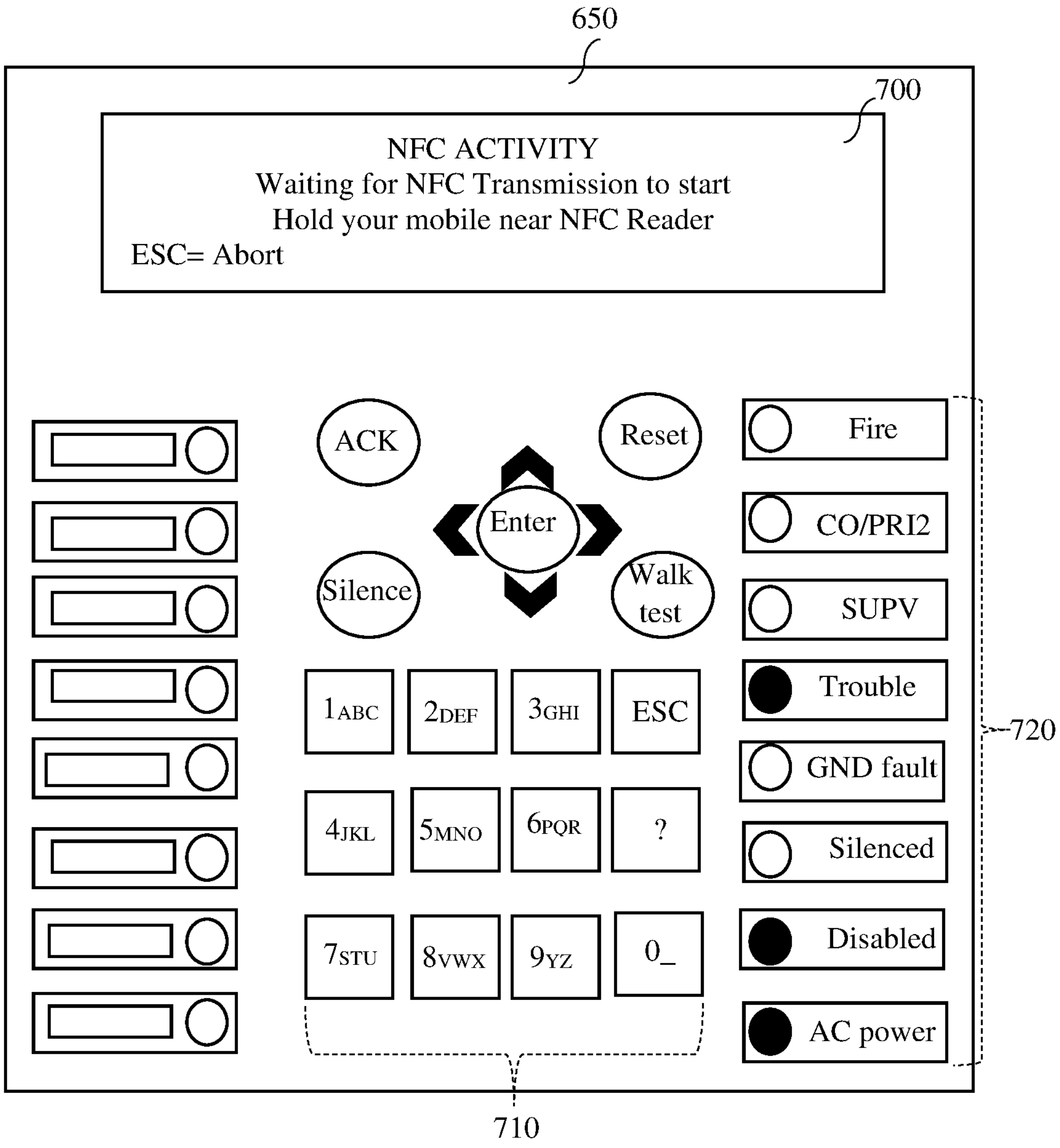
Figure 14:
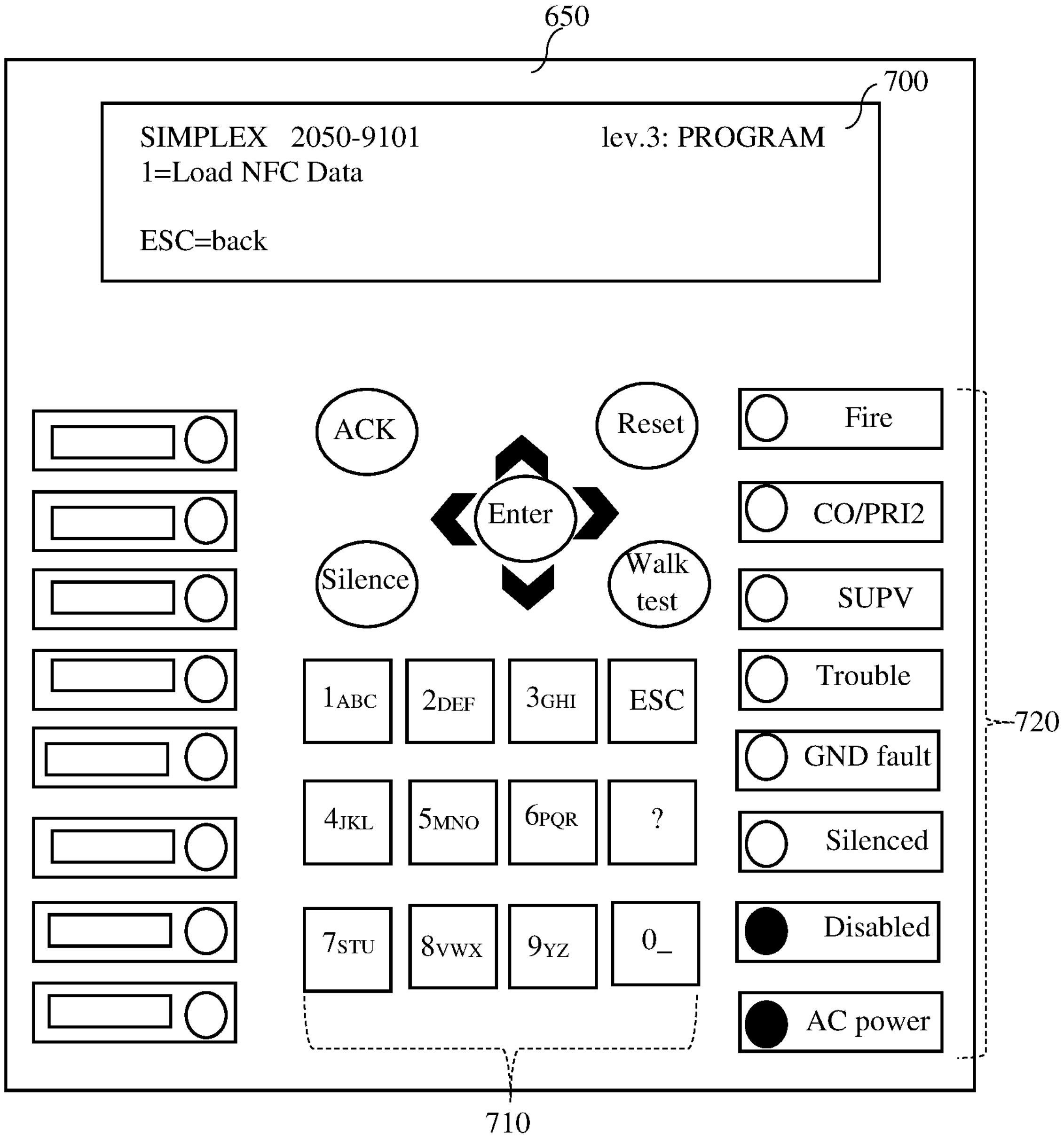

In an aspect of the present disclosure, a user gains access of the control panel 510 by authenticating himself. In some embodiments, as shown in FIG. 11, the user interface 650 displays and provides multiple options to the user. The multiple options include, but are not limited to, auto, device, output, gateway, USB, system, default, device mapping, and NFC. Here, NFC denotes short-range communication. The user can select desired option using the user input means 710. For transfer of one or more data packets, the user needs to select option 'NFC'. In some embodiments, the authenticator 780 authenticates the user before the communication module 640 is activated, i.e., the user interface 650 may prompt the user to provide credential to activate short-range wires communication post selection of option 'NFC'. The provided credentials are then verified by the authenticator 780. In some embodiments, the authenticator 780 authenticates the user before displaying aforementioned options on the user interface 650. After successful authentication, the communication activator 790 activates the communication module 640 and displays a message 'Waiting for NFC Transmission to start; Hold your mobile near NFC Reader' (as shown in FIG. 12) on the display of user interface. The user needs to place the portable electronic device 680 with an active short-range communication facility (for example, NFC) proximal to the communication module 640 or the data transfer region 580 in order to initiate data transmission. In some embodiments, the user is required to keep the portable electronic device 680 in physical contact with the data transfer region 580. Once the short-range communication between the portable electronic device 680 and the communication module 640 is established, the communication activator 790 displays a message 'NFC Transfer: IN PROGRESS' (as shown in FIG. 13) with filled blocks showing the progress of data transfer. In some embodiments, after establishing communication, the processing circuit 620 receives confirmation from the user about receiving data packets via the short-range communication. The processing circuit 620 may display a message '1=Load NFC Data' (as shown in FIG. 14). Once the user confirms the data transfer by selecting this option, the data validator 800 initiates receiving data packets from the portable electronic device 680 via the communication module 640. It is to be noted that aforementioned operative configuration is elaborated for explanation purposes and can be altered as per user's requirement. The processing circuit 620 is also configured to display various other messages for example, completion of data transfer, updating the configuration, rebooting system, failure in updating activity etc., on detection of corresponding events.

In an embodiment, the portable electronic device 680 includes a processor, a memory, a display, and a wireless I/O. The processor works in combination with wireless I/O in order to communicate with the control panel 510. The portable electronic device 680 is provided with a near-field communication module to facilitate communication with communication module 640 of the control panel 510. In one embodiment, the near-field communication module can be detachably attached to the portable electronic device 680 to enable communication with control panel 510. The portable electronic device 680 may be configured, via software resident in the memory, to access one or more aspects of the control panel 510. For example, the portable electronic device 680 may access one or more data residing in the repository 770 of the control panel 510. In some embodiments, the portable electronic device 680 can transmit a request to the control panel 510, wherein the processing circuit 620 of the control panel 510 is configured to process the request and provide data corresponding to the request to the portable electronic device 680 via the communication module 640. For example, a user can put a request through the portable electronic device 680 regarding extracting diagnostics logs from the repository 770 of the control panel 510. The processing circuit 620 receives the request, processes it, extracts diagnostics logs data and transmits the diagnostics logs data to the portable electronic device 680 via the communication module 640.

In one non-limiting embodiment, the display of the portable electronic device 680 may be used to duplicate the user interface 650 of the control panel 510. The display of the portable electronic device 680 can be configured to accept user commands. For example, a user may enter commands via display of the portable electronic device 680. The display of portable electronic device 680 can be a touchscreen.

The memory of the portable electronic device 680 may include software configuration tools in order for the portable electronic device 680 to configure the control panel 510. The software configuration tools resident in the portable electronic device 680 may be the same as the software configuration tools resident at the control panel 510. Alternatively, the software configuration tools resident in the portable electronic device 680 may be different from the software configuration tools resident at the control panel 510, such as including a different user interface.

Further, the portable electronic device 680 is communicatively connected with a server (not shown in figures). In an embodiment, the server can be one or more of a cloud server, a remote server, an on-premises server, a personal computer, and the like. The portable electronic device 680 is configured to receive data packets regarding updates of configuration information or a portion of updated configuration information pertaining to the control panel 510 from server. The updated configuration information can be fed to the control panel 510 by the portable electronic device 680 utilizing communication module 640. In one embodiment, the updated configuration information can be pre-stored within the memory of the portable electronic device 680. The portable electronic device 680 can be provided with a software based application to download data packets and transmit to the control panel 510. The application can be downloaded from the server. The application can be configured to authenticate the portable electronic device 680. The authentication can be performed using a list of allowed portable devices with their specific IDs, passwords, specific IDs provided by manufacturer of the control panel 510, etc.

The present disclosure envisages a method for updating configuration information of the control panel. The method includes steps of establishing a short-range wireless communication with a portable electronic device; receiving one or more data packets from the portable electronic device; and updating at least a part of configuration information using the one or more data packets.

Figure 15:
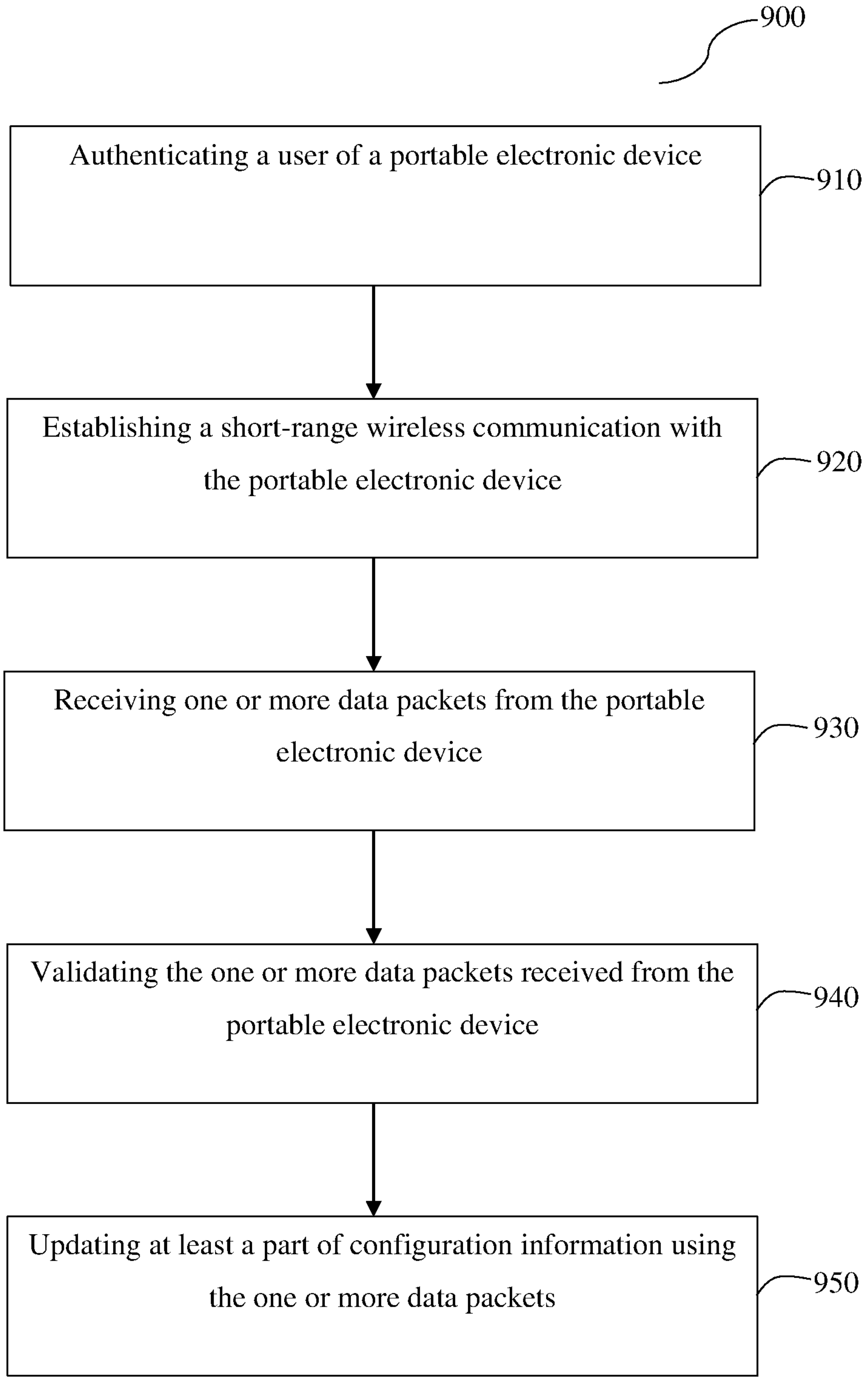
FIG. 15 is a flowchart depicting steps of a method of the present disclosure, according to some embodiments.

Referring now to FIG. 15, a method 900 for updating configuration information of the control panel 510 is described in more details. Steps of the method 900 can be executed using the processing circuit 620. The method 900 includes a step 920 of establishing a short-range wireless communication with the portable electronic device 680. The control panel 510 includes the communication module 640 provided with the NFC unit 690 that can establish short-range wireless communication with the portable electronic device 680. In some embodiments, the portable electronic device 680 is required to be proximal or in physical contact with the data transfer region 580 to establish the short-range communication with the NFC unit 690.

In some embodiments, the method 900 includes a step 910 of authenticating a user of the portable electronic device 680 prior to establishing the short-range wireless communication via the authenticator 780 of the processing circuit 620. The processing circuit 620 includes the authenticator 780 that authenticates a user prior to establishing short-range wireless communication. The authenticator 780 can authenticate the user based on user credentials received from the user such as passwords, patterns, biometric details etc.

In some embodiments, the user is authenticated by the authenticator 780 before accessing one or more functionalities of the control panel 510. In some other embodiments, the user is authenticated by the authenticator 780 before activating the communication module 640.

The short-range wireless communication between the portable electronic device 680 and the control panel 510 is established using a near field communication (NFC) unit of the communication module 640 (step 920). In some embodiments, the processing circuit 620 activates NFC unit 690 after authenticating a user of the portable electronic device 680. The short-range wireless communication between the portable electronic device 680 and the communication module 640 is established when the portable electronic device 680 is proximal to the data transfer region 580.

The method 900 further comprises a step 930 of receiving one or more data packets from the portable electronic device 680. The processing circuit 620 receives the data packets from the portable electronic device 680 through the communication module 640 and validates the data packets. The processing circuit 620 can validate individual data packets and provide tags to them In some embodiments, the method 900 comprises a step 940 of validating the one or more data packets received from the portable electronic device 680. The processing circuit 620 validates the data packets and tags them as valid or invalid. The tags can be provided to each data packet individually or to batches of data packets or to all data packets received.

The method 900 further comprises a step 950 of updating at least a part of configuration information using the one or more data packets. The configuration information is typically stored in the repository 770. The processing circuit 620 utilizes valid data packets to update the configuration information. The configuration information can be updated partially or completely based on valid data packets. For example, the processing circuit 620 may receive data packets corresponding to a new device, validates the data packet, and add/update information in the data packet in the configuration information. In another example, the processing circuit 620 may receive data packets corresponding to an existing device whose configuration information is preloaded in the repository 770, validates the data packet, and update a part of the configuration information corresponding to the existing device with valid data packets.

The present disclosure utilizes short-range communication as one of the preferred ways of communication over Wi-Fi, Bluetooth, and other known wireless technologies due to following advantages:

- Short-range communication such as NFC consumes least amount of power. For example, a typical NFC unit consumes less than 100 mW power, whereas power consumption of Bluetooth is around 250 mW and that of Wi-Fi is around 2 to 3 W;
- Data Transfer rate of NFC is superior;
- Minimal interference since the devices connected using NFC are required to be in proximity to each other; and
- NFC is an encrypted method of transferring data over wireless means making it one of the safest means of wireless transmission because of protocols like ISO/IEC 15693, ISO/IEC 18000-3, ISO/IEC 14443 A and B, and FeliCa.

Technical Advancements

The present disclosure described herein above has several technical advantages including, but not limited to, the realization of a control panel for fire alarm systems that:

- is cost effective;
- is user friendly;
- eliminates set up time required for establishing communication link; and
- eliminates need of wired connection with portable electronic devices.

Configuration of Exemplary Embodiments

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A fire alarm control panel (FACP) for a fire alarm system, the FACP comprising:

a housing;

a communication module configured within the housing for short-range communication with a portable electronic device; and a data transfer region visibly defined by an opening or markings on a door of the housing of the FACP or on a cover provided between the door and a housing body of the housing of the FACP, wherein the data transfer region is visually identifiable on the housing of the FACP by a user that interacts with the FACP, wherein, from a visual perspective of the user that interacts with the FACP, the communication module is spatially located behind the data transfer region, wherein the communication module is configured to establish the short-range communication with the portable electronic device when the portable electronic device is held proximal to the data transfer region by the user that interacts with the FACP.

2. The FACP of claim 1, wherein the communication module includes a near field communication (NFC) unit.

3. The FACP of claim 1 further comprising a processing circuit configured to:

store configuration information pertaining to the fire alarm system;

receive one or more data packets from the portable electronic device via short-range wireless communication; and update at least a part of the configuration information using the one or more data packets.

4. The FACP of claim 1, wherein the door is a metallic door, wherein the data transfer region is visibly defined by a non-metallic portion provided on the metallic door of the housing of the FACP.

5. The FACP of claim 4, wherein the non-metallic portion that defines the data transfer region on the metallic door of the housing comprises a transparent glazing that enables the user to view components within the housing without opening the metallic door.

6. The FACP of claim 1, wherein the door comprises a metallic material, wherein the cover on which the data transfer region is visibly defined comprises a non-metallic material configured to facilitate radio frequency data transfer therethrough.

7. A fire alarm control panel (FACP) for a fire alarm system, the FACP comprising:

a housing;

a communication module configured within the housing and configured to establish a short-range wireless communication with a portable electronic device of a user;

a data transfer region visibly defined by an opening or markings on a door of the housing of the FACP or on a cover provided between the door and a housing body of the housing of the FACP, wherein the data transfer region is visually identifiable on the housing of the FACP by the user, wherein, from a visual perspective of the user, the communication module is spatially located behind the data transfer region, wherein the communication module is configured to establish short-range communication with the portable electronic device when the portable electronic device is held proximal to the data transfer region by the user; and a processing circuit configured to:

store configuration information pertaining to the fire alarm system;

receive one or more data packets from the portable electronic device via the short-range wireless communication; and update at least a part of the configuration information using the one or more data packets.

8. The FACP of claim 7, wherein the processing circuit is further configured to authenticate the user of the portable electronic device prior to receiving the one or more data packets.

9. The FACP of claim 8, wherein the processing circuit is further configured to receive one or more user credentials of the user via a user interface of the FACP.

10. The FACP of claim 7, wherein the communication module includes a near field communication (NFC) unit configured to establish the short-range wireless communication.

11. The FACP of claim 7, wherein the processing circuit is further configured to fall back to historical configuration information upon detecting failure in updating the configuration information.

12. The FACP of claim 7, wherein the processing circuit is further configured to validate the one or more data packets received from the portable electronic device prior to updating the configuration information.

13. A method comprising:

establishing, by a communication module configured within a housing of a fire alarm control panel (FACP) of a fire alarm system, a short-range wireless communication with a portable electronic device of a user, wherein the housing of the FACP comprises a data transfer region visibly defined by an opening or markings on a door of the housing of the FACP or on a cover provided between the door and a housing body of the housing of the FACP, wherein the data transfer region is visually identifiable on the housing of the FACP by the user, wherein, from a visual perspective of the user, the communication module is spatially located behind the data transfer region, wherein the communication module is configured to establish short-range communication with the portable electronic device when the portable electronic device is held proximal to the data transfer region by the user;

receiving one or more data packets from the portable electronic device; and updating at least a part of configuration information using the one or more data packets.

14. The method of claim 13, further comprising authenticating the user of the portable electronic device prior to establishing the short-range wireless communication.

15. The method of claim 13, further comprising validating the one or more data packets received from the portable electronic device prior to updating the configuration information.

16. The method of claim 13, wherein establishing the short-range wireless communication comprises using a near field communication (NFC) unit.

17. The method of claim 16, further comprising activating the NFC unit upon authenticating the user of the portable electronic device.

* * * * *